Aug. 25, 1925.

H. E. RUDOLPH ET AL 1,551,218

MEASURING DEVICE FOR DISPENSING TANKS

Filed Jan. 22, 1925

INVENTORS.
HARRY E. RUDOLPH
WALTER C. REED
BY R. W. Smith
ATTORNEY.

Patented Aug. 25, 1925.

1,551,218

UNITED STATES PATENT OFFICE.

HARRY E. RUDOLPH AND WALTER C. REED, OF LOS ANGELES, CALIFORNIA; SAID REED ASSIGNOR TO SAID RUDOLPH.

MEASURING DEVICE FOR DISPENSING TANKS.

Application filed January 22, 1925. Serial No. 3,979.

*To all whom it may concern:*

Be it known that we, HARRY E. RUDOLPH and WALTER C. REED, citizens of the United States, residing at Los Angeles, in the county of Los Angeles and State of California, have invented certain new and useful Improvements in Measuring Devices for Dispensing Tanks, of which the following is a specification.

This invention is an improvement in measuring mechanism for use in connection with pressure operated dispensing tanks, as set forth in our co-pending application Ser. No. 753,098, filed Dec. 1, 1924.

The measuring mechanism includes a piston adapted to form a measuring chamber of any predetermined capacity as determined by the movement of the piston; and valve mechanism associated therewith and adapted to open for filling the measuring chamber with material from the dispensing tank, and arranged for subsequent closing so that movement of the piston by the pressure in the dispensing tank will discharge the measured quantity of material.

It is the object of the invention to provide for movement of the piston with minimum effort when adjusting the same to measure a predetermined quantity of material.

It is a further object of the invention to provide for initially opening the valve mechanism by unseating closure means of relatively small area, the pressure against which may be overcome with little effort; and then further opening the valve mechanism by unseating a closure means of relatively large area, the pressure against opposite faces of which will have been equalized by the initial opening of the valve, to permit said subsequent unseating with minimum effort.

The invention will be readily understood from the following description of the accompanying drawings, in which.

Figure 2:
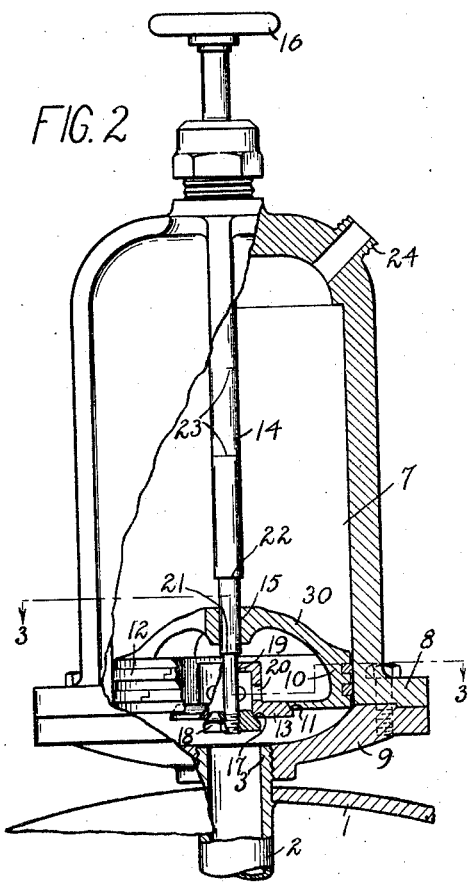
Fig. 2 is a side elevation of the measuring device, partly in vertical section.
Figure 1:
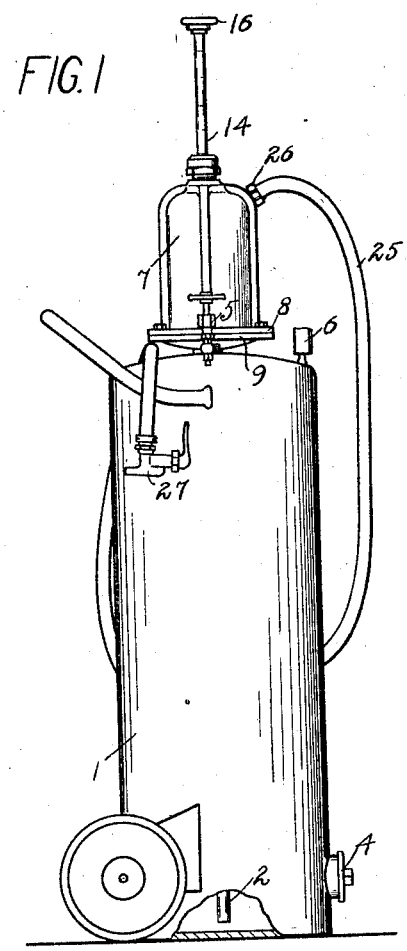
Fig. 1 is a side elevation of the measuring device mounted upon a dispensing tank.
Figure 3:
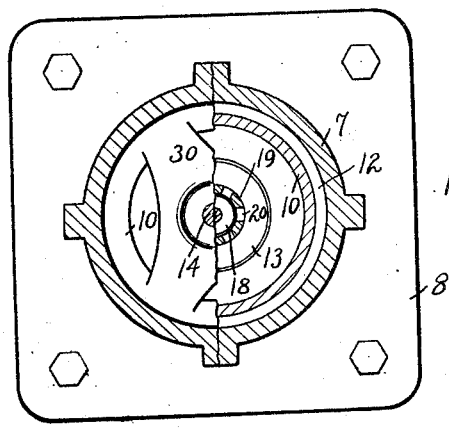
Fig. 3 is a transverse section on the line 3—3 of Fig. 2.

The measuring mechanism is illustrated as employed in connection with a usual grease tank 1, having a discharge pipe 2 extending into the same and forming a coupling nipple 3 at the top of the tank. The opening through which grease is supplied to the tank is closed by a plug 4, and by charging the tank with compressed air through a valve 5, any desired pressure as registered by a gauge 6, is maintained on the grease in the tank so as to tend to force the same outwardly through pipe 2.

The measuring device comprises a container communicating with nipple 3 and having a normally closed outlet at its opposite end. A piston is adapted to be reciprocated in the container, and a valve cooperating therewith is opened when the piston is moved toward nipple, so that grease will be forced through the open valve and into the space above the piston, thereby measuring any predetermined quantity of grease as determined by the movement of the piston.

When the outlet at the opposite end of the measuring container is subsequently opened, the pressure of the grease closes the valve and forces the piston in the opposite direction for discharge of the measured quantity of grease through the open outlet.

The measuring container is shown at 7, and is preferably provided with a flanged open base 8 adapted to be bolted to a coupling flange 9, which is in turn threaded onto the nipple 3.

The piston 10 which reciprocates in the container is provided with usual piston rings 12 adapted to form a snug sliding fit in container 7, and the piston has an axial opening forming a valve seat 11. A valve head 13 cooperates with the valve seat and is loosely mounted on an operating rod 14 which extends upwardly through the axial opening in the piston and thence through the upper end of container 7. A handle 16 is provided on the outer end of the operating rod for actuation thereof.

The valve head 13 has an axial opening forming a valve seat 17, and the end of rod 14 extends through said axial opening with a valve head 18 fixed thereon and cooperating with seat 17, so that depression of the rod will shift head 18 relative to the head 13 and thus open valve 17.

A spider 30 extending upwardly from the piston 10 forms a bearing 15 in which rod 14 is slidably mounted, and said rod is also slidably mounted in a bearing 19 supported by head 13. The support for bearing 19 is provided with ports 20 so that fluid passing through the open valve 17 may flow through the axial opening in piston 10, and the legs of spider 30 are spaced to form openings between the same so that fluid passing through the axial opening in the piston by opening of either valve 17 or 11, will enter the container 7 above the piston.

A shoulder 21 which is formed on rod 14 by reducing the diameter of its lower end, is adapted to impinge against bearing 19 after opening of valve 17, so that continued depression of the rod will shift head 13 relative to the piston 10 and thus open valve 11; and a second shoulder 22 which is formed on rod 14 by another change in its diameter, is adapted to impinge against bearing 15 after opening of valve 11, so that continued depression of the rod will shift the piston 10 downwardly in the container 7.

The rod 14 is provided with graduations 23 indicating fractional or full depression of the piston between its limits of movement in container 7, in order that the piston may be depressed to form a measuring chamber of any desired, measured capacity.

A discharge nipple 24 communicates with the measuring chamber formed by the piston, beyond the limit of movement of the latter, and a hose 25 is connected thereto by a coupling 26, with the end of said hose provided with a normally closed valvular discharge nozzle 27.

In operation, with the piston at its upper limit of movement, initial depression of rod 14 will open valve 17 and thus balance the pressure at opposite sides of the piston. The valve 17 is readily opened since the head 18 cooperating therewith is of but small area, and consequently the pressure against said head offers but little resistance to opening movement thereof.

Continued depression of the rod 14 will then open valve 11 through exertion of minimum effort, due to the equalizing of the pressure against opposite sides of said valve; and still further depression of the rod will then lower the piston in container 7 with the valves in open position, to form a chamber of desired measured capacity above the piston.

After depression of the piston to the desired point, the pressure in tank 1 forces grease through the open valves so as to fill the measuring chamber which has been formed above the piston; and when nozzle 27 is subsequently opened so as to relieve the pressure against the upper face of the piston, the pressure in tank 1 will close valves 17 and 11 and then force the piston upwardly to its limit of movement in container 7, thereby discharging the measured quantity of grease through hose 25 and the open nozzle.

We claim:

1. The combination of a container having an inlet adapted for communication with a source of fluid, means for forming a measuring chamber of predetermined variable capacity in said container, and valvular means, comprising closure means of relatively small area adapted for initial opening, and closure means of relatively large area adapted for subsequent opening to fill the measuring chamber from said inlet.

2. The combination of a container having an inlet at one end adapted for communication with a source of fluid, a piston adapted to reciprocate in said container, and valvular means cooperating with said piston and comprising closure means of relatively small area adapted for initial opening and closure means of relatively large area adapted for subsequent opening to fill the space between the piston and the opposite end of the container with fluid supplied through said inlet.

3. The combination with a dispensing tank having a pressure discharge, of a measuring container communicating at one end with said discharge and having a normally closed outlet at its opposite end, a piston adapted to reciprocate in said container, operating means, and valvular means cooperating with said piston and comprising closure means of relatively small area adapted for initial opening and closure means of relatively large area adapted for subsequent opening by movement of said operating means, said movement of the operating means shifting the piston in said container toward said pressure discharge after opening of said valvular means, the opening of said valvular means causing communication between said pressure discharge and the space in the container between its outlet end and the piston, and the parts being arranged whereby opening of said normally closed outlet will close the valvular means and shift the piston in the opposite direction in the container by the pressure through the pressure discharge.

4. The combination of a container having an inlet end adapted for communication with a source of fluid, a piston adapted to reciprocate in said container, valvular means in said piston opening toward the inlet end of said container, an operating rod, said valvular means comprising closure means of relatively small area and closure means of relatively large area, and cooperating abutments on said operating rod, piston, and closure means arranged whereby initial movement of the rod will open the small closure means, and continued movement of the rod will then open the large closure means and subsequently shift the piston in the container toward the inlet end of the latter, said valvular means being free to close by pressure against the piston in the opposite direction.

In testimony whereof we have affixed our signatures to this specification.

HARRY E. RUDOLPH.
WALTER C. REED.